C. P. TOLMAN.
COMBINED MOTOR AND COMPRESSOR.
APPLICATION FILED NOV. 16, 1905.

901,499.

Patented Oct. 20, 1908.
4 SHEETS—SHEET 1.

WITNESSES:

Charles P. Tolman.
INVENTOR.

BY
ATTORNEY.

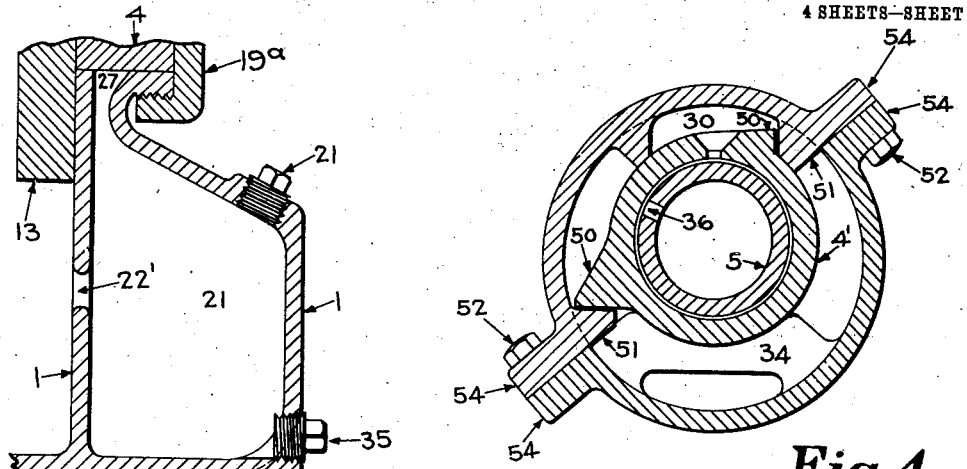
Fig. 3.
Fig. 4.
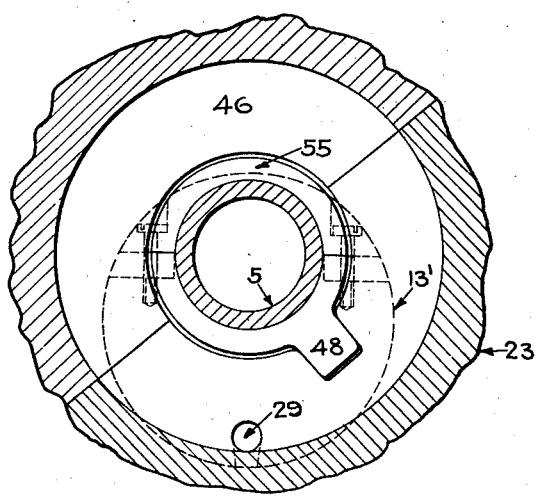
Fig. 5.
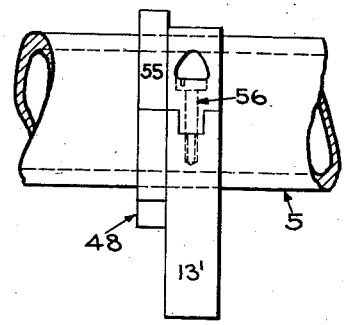
Fig. 6.
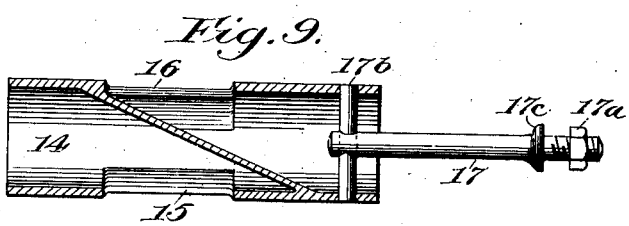
Charles P. Tolman
INVENTOR.
BY Elwin W. Hulse
ATTORNEY.

C. P. TOLMAN.
COMBINED MOTOR AND COMPRESSOR.
APPLICATION FILED NOV. 16, 1905.

901,499.

Patented Oct. 20, 1908.
4 SHEETS—SHEET 4.

WITNESSES:

Charles P. Tolman
INVENTOR.

BY
ATTORNEY.

UNITED STATES PATENT OFFICE.

CHARLES P. TOLMAN, OF NEW YORK, N. Y., ASSIGNOR, BY MESNE ASSIGNMENTS, TO THE ROTENG MANUFACTURING COMPANY.

COMBINED MOTOR AND COMPRESSOR.

No. 901,499.      Specification of Letters Patent.      Patented Oct. 20, 1908.

Application filed November 16, 1905. Serial No. 287,561.

*To all whom it may concern:*

Be it known that I, CHARLES P. TOLMAN, a citizen of the United States, residing at New York city, in the State of New York, have invented a new and useful Combined Motor and Compressor, of which the following is a specification.

The combinations of these devices as now constructed are cumbersome, undesirable and impractical for many uses, particularly that of supplying compressed air for air brake purposes on electric or steam cars, where weight and space are potent factors of economy of operation. There is also no provision made in such combinations for supplying lubrication to all moving parts of the same by a simple and continuous system such that all parts of the combined apparatus will receive their required lubrication from a common reservoir, and the object of this invention is to provide a simple, compact, light and durable form of combined motor and compressor of the rotary type which shall also be provided with a simple and continuous system of oiling for all moving parts.

Another apparent object is to afford a means for cooling the motor by the incoming air.

With these ends in view my invention consists of the novel features and combinations of parts described hereinafter and specified in the claims.

I have preferably used for my compressor in this combination the type of rotary engine described in United States patents to Nielsen, No. 720,952, dated February 17, 1903, and No. 755,161, dated March 22, 1904. For this reason I shall not refer to the details of construction or operation of that device to greater extent than is necessary to fully describe its application to this combination.

Figure 1:
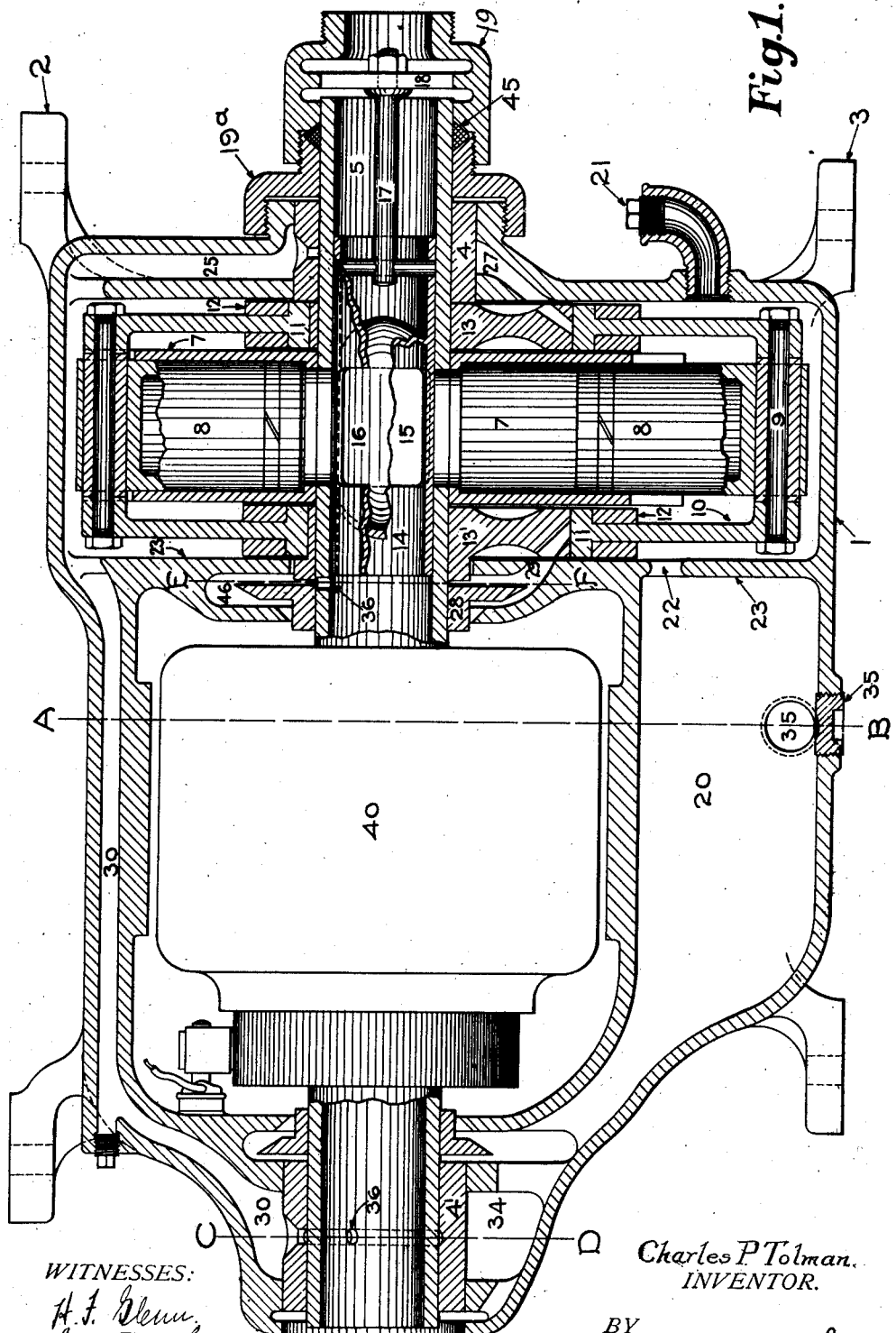
Figure 2:
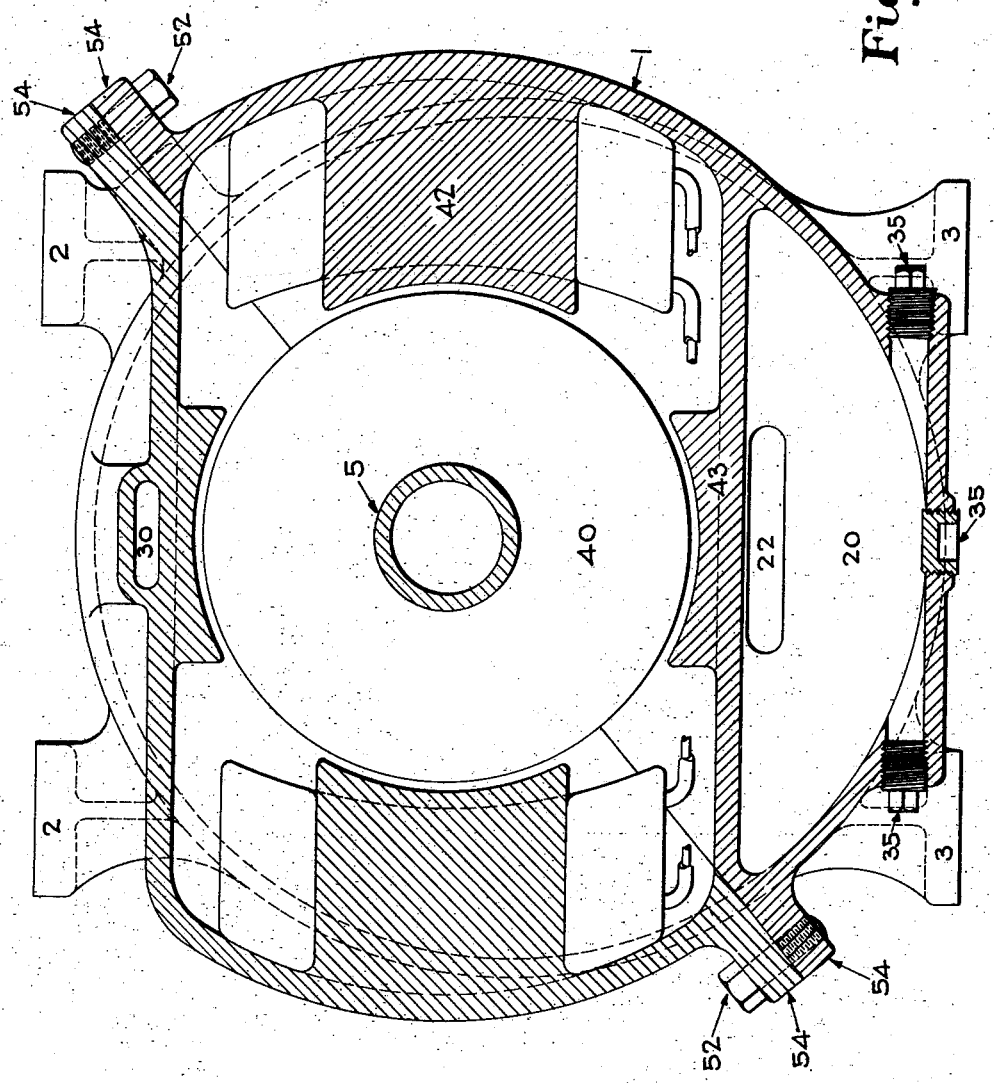
Figure 8:
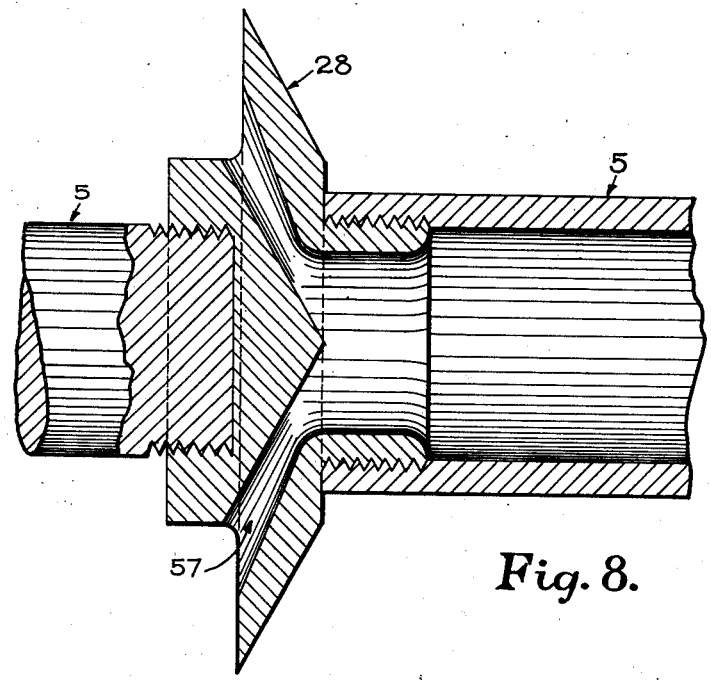
Figure 7:
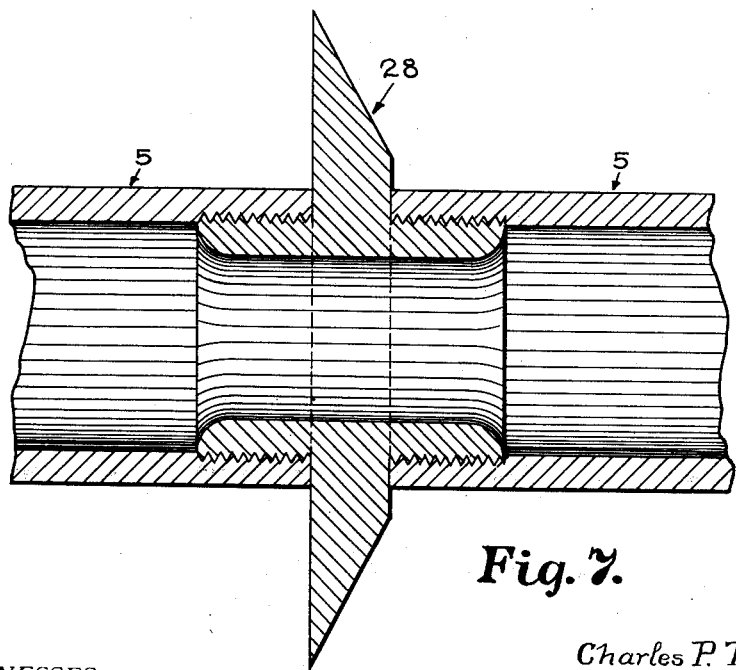

In the illustrations I show one means by which my invention may be carried out, in which Figure 1 shows a longitudinal section of the device, Fig. 2, a vertical section on line A—B, Fig. 3, a broken section of the case showing the reservoir attached on the compressor side of the same, Fig. 4, a vertical section on line C—D, Fig. 5, a vertical section on the line E—F, and Fig. 6, a front view of the bearing 13'. Figs. 7 and 8 are horizontal sections of modified forms of the shaft, and Fig. 9 a detail view of the valve in vertical section.

Like numerals of reference indicate like parts in all the figures.

Referring to the drawings numeral 1 designates a stationary casing or frame inclosing the working parts and conformed thereto, and provided on its upper surface with lugs 2 for supporting the same, as, for example, to the bottom of a car by the method commonly known as ceiling suspension, said frame also being provided with lugs 3 for attaching the same to the floor when that form of installation is to be used. A hollow shaft 5 is journaled on bearings 4 and 4' carried by the frame 1, and the pistons 8 reciprocating in the cylinders 7 are suspended by wrist pins 9 from the yokes 10, the lower extremities of the arms of which yokes terminate in segmental lugs 11 movably mounted on suitable bearings 13 and 13' encircled and restrained to said bearings by suitable rings 12, said bearings being eccentrically located with respect to said shaft 5.

A suitable valve 14 in said hollow shaft, having an inlet port 15 and an outlet port 16, constructed so as to communicate with ports in the inner ends of each of said cylinders 7 is held in position by a rod 17 which is suitably anchored to a spider 18 formed in cap 19, which cap is suitably supported from the frame 1 by the cap 19ᵃ, the joint between said caps being so constructed as to provide for a packing gland 45. The anchorage of the rod 17 in spider 18 is so formed that valve 14 may be adjusted and held in a definite position with reference to the axes of rotation of said cylinders and pistons both as regards sliding and rotary motion.

The adjustment of valve 14 serves to place the valve in the correct position in the shaft with reference to the ports in said shaft, it being apparent that for practical and successful operation the valve ports must register longitudinally with the shaft ports to make their full length available, and at the same time, the valve port must be so circumferentially situated with reference to the dead center of the mechanism that intake and exhaust of fluid will begin at the proper time according to the position of the pistons in the cylinders. This adjustment of the valve is made when the machine is assembled; but further adjustment may be accomplished if it should be necessary at any time in the manner above described.

In order to adjust the valve it is only necessary to release lock nut 17ª. Then by turning rod 17, valve 14, which is attached to this rod by means of pin 17ᵇ, may be rotated about its own longitudinal axis to the desired position within the shaft. Lock nut 17ª is then tightened against spider 18 and further rotation of the valve is impossible. A shoulder 17ᶜ on rod 17 determines the longitudinal position of the valve. A slight degree of flexibility is allowed in the connection between rod 17 and valve by making a free fit of pin 17ᵇ in openings 17ᵈ in the valve body, or in the opening in stem 17 where pin 17ᵇ passes through the stem, as shown in Fig. 9.

The armature of the motor (the drawings show a motor of the direct current type, though other forms of electric or fluid pressure motors may be used equally well, it being apparent that a fluid pressure motor of the Nielsen type, or of any other suitable type, could be used instead of an electric motor) is suitably mounted on said hollow shaft 5, and inclosed in case 1, which case preferably forms a part of the magnetic circuit or circuits for the field of the motor 40, the field pieces being an integral part of the said case or suitably attached thereto.

Fig. 2 shows the motor as being of the four pole direct current type with two salient poles 42 and two consequent poles 43. The motor is preferably separated from the compressor by a partition 23, as shown in Fig. 1. The power to operate the motor is led into the same through the ordinary leads passing through suitably insulated openings in the frame or case 1.

I prefer to admit the fluid to be acted upon through the motor end of the shaft and discharge through the compressor end, for the incoming air as it passes through the shaft will tend to cool the motor and also the shaft bearing at that end of the shaft; but it will be seen that by reversing the direction of motion of the moving parts or by properly changing the angular position of the valve, the inlet and discharge of the fluid may also be reversed. In either case the device can be used as a motor-driven vacuum pump, the connection which serves as the suction in the case of the compressor being coupled to the reservoir or apparatus to be exhausted.

In the base of the case or frame 1 I provide a settling reservoir 20 on either or both sides of the compressor compartment as shown in Figs. 1 and 3, with suitable overflow ports 22 and 22' in the partition 23 and frame 1 to permit communication between said reservoir or reservoirs and the compressor chamber, said ports being of sufficient height above bottom of settling chamber to retain at all times an appreciable volume of lubricant in said chamber, which lubricant is quiescent, permitting deposition of the sediment, the reservoir being provided with suitable plugs 35 to permit the withdrawal of the sediment and lubricant, and suitable means 21 being provided for filling the same with the lubricant. A duct 25 in the upper portion of the frame leads to a bearing 4, a duct 27 in the lower portion of said frame leading from said bearing to bearing 13 which carries the segmental lugs 11 of the yokes 10. An oil guard ring 28 of suitable construction attached to and rotating with the said shaft 5 and located in a chamber 46 in partition 23 of the frame prevents any lubricant conducted on said shaft 5 from passing into the motor case, such lubricant being collected in said chamber, from whence by the duct 29 said lubricant preferably drains back into the compressor chamber so as to assist in the lubrication of bearing 13' as it passes the same.

Bearing 13' may be made as an integral part of the case or as a separate piece suitably attached thereto or supported thereon.

Another duct 30 in the upper part of the case leads from the compressor chamber to bearing 4', a duct 34 in the lower portion of said case leading from said bearing 4' to the settling reservoir 20. If the settling reservoir 21 of Fig. 3 is used, the duct 27 also leads into that reservoir, as shown in Fig. 3.

At the inlet end of the shaft (shown here as the motor end) I provide a suitable port 36 or 36' through which the lubricant enters the shaft 5 and in consequence of the suction therein produced by the operation of the device, said lubricant is carried to the valve 14, which is thereby lubricated.

It is thus seen that when the motor armature 40 is set in motion it carries with it on the shaft 5 the cylinders of the compressor which are mounted on the same shaft as shown in Fig. 1. By virtue of the fact that the common bearings 13 and 13' of the pistons are eccentric with reference to the shaft the pistons are caused to reciprocate in the cylinders, each piston making one complete stroke for every revolution. As the piston in any cylinder travels outward, the port in said cylinder and shaft 5 being in communication with the inlet port 15 of the valve 14 during the greater part of said stroke, the fluid to be compressed is drawn or sucked through the inlet end of the shaft 5 and through said communicating ports into said cylinder. On the completion of the outward stroke the cylinder port overtravels the inlet ports in the valve, cutting off communication from said valve to the cylinder. On continued motion communication is established between the cylinder, through its said port, and the cavity of said valve through its discharge port 16, and the piston, which is, meanwhile, moving inwardly in the cylinder, compresses and expels the fluid from the cylinder into the cavity of the valve 14, from whence it may be conducted by suitable means to the point of storage or use.

The motion of the pistons through the lubricant in the base of the frame, the reservoir having been filled to such depth with the lubricant that the same overflows through port 22 or port 22' into the settling reservoirs, serves to lubricate the pistons and wrist pin bearings. The copious lubrication of the pistons serves to conduct the lubricant to the inner part of the cylinders, thereby lubricating them and the packing rings therein. The rapid revolution of the cylinders serves, by the paddle-like effect of the rotating parts, to carry the lubricant about the interior of the casing 1 in a continuous stream, the centrifugal effect of the circular motion of the lubricant causing the same to flow into ducts 25 and 30 in the upper part of the case, through which ducts the lubricant continues to flow by gravity to the various bearing surfaces as above described, the lubricant returning eventually through the ducts 27, 29 and 34 to the common reservoir.

It is evident that my invention may be carried out equally well with the shaft composed of two or more parts suitably coupled. Any of the well-known means for coupling may be used, and one such means is shown in Fig. 7, in which, for convenience, I have shown a threaded coupler combined with the oil guard ring 28 on which the adjacent ends of the shafts are screwed, the shafts abutting against their respective sides of the guard disk. If in this combination the motor shaft is solid, as shown in Fig. 8, provision must be made for the passage of the fluid to or from the hollow shaft of the compressor, a method for doing which is shown in said figure, by fluid passage 57 through the coupler. When the coupler shown in Fig. 8 is employed proper communication, of course, must be provided between the guard disk chamber and the atmosphere or source of supply of fluid for compression. Another means permitting the use of a solid shaft for the motor is by the use of a valve, which shall provide for the inlet and outlet of the fluid at the same end of the compressor shaft. Such a valve is described and shown in Letters Patent Number 830,024 granted to me on September 4, 1906.

To provide a convenient means for access to the interior of the device I preferably divide case 1 into two parts or portions on a plane passing through the longitudinal axis of shaft 5, and intersecting the walls of the case in such manner as to interfere as little as possible with the mechanical and electrical parts therein contained or their mechanical construction or the heretofore described lubricating system.

As shown in Fig. 2, I have provided both portions of the casing with flanges 54, in which provision is made for bolts 52, said bolts serving to hold the parts of the casing together in their normal positions. The arrangement shown in said figure is the most preferable as it permits the removal of the top or bottom portion of the case according as the apparatus is suspended as by lugs 2 or supported as hereinbefore described.

In cases where the apparatus is supported by lugs 2 as, for example, on the bottom of a car where the compressor is used for air brake purposes, further facility in inspecting or dismantling the apparatus in place is afforded by the construction illustrated in Fig. 4, the object of which is to permit the removal of the bottom portion of the casing 1, leaving the moving parts of the motor and compressor suspended in their bearings in such manner that they also can be subsequently readily removed. This is accomplished in detail as follows: Referring again to Fig. 4, which is a section on line C—D in the direction indicated by the arrow, bearing 4' at the motor end of shaft 5, it being understood that the same or similar construction is used in bearing 4 at the compressor end of said shaft, has lugs 50 formed on or suitably attached to it; lugs 51 are formed on or attached to the upper portion of the case immediately opposing said lugs 50. It will then be readily seen that on the removal of the lower portion of case 1, and as a consequence thereof, the support from the bottom of the bearing, lugs 50, if not already in contact, immediately come in contact with and are sustained by lugs 51. This action takes place similarly in bearing 4. It is then only necessary to slide the bearings longitudinally on the ends of shaft 5, when said shaft and its attached mechanism is free to leave the case.

Fig. 5 shows a construction for bearing 13' and a means for supporting the same in its proper position such as to permit the removal of the moving parts of the motor and compressor and their common shaft intact. Bearing 13' proper carries as a part thereof boss 55, room for which is provided in partition 23. Lug 48 formed on or attached to said bearing or boss 55 is fitted in a recess provided in partition 23, preferably in the lower portion of the case. Bearing 13' is fitted with a "running" fit upon shaft 5, and in order that it may be readily removed from or applied to said shaft, it is parted, as is shown in Figs. 5 and 6, on a plane passing through the longitudinal axis of shaft 5, said parts being properly mated by a tongue and groove, as shown, or by other equivalent means, and held together by screws 56, substantially as shown, the screws preferably entering from the top part of the bearing since the least pressure and least wear is on that portion of the bearing surface. A similar construction is provided for bearing 13.

Bearing 13' is not intended to and does not support shaft 5. Its sole use and purpose is to form a support for piston yokes 10. Shaft 5 is therefore supported in the case by only two bearings 4 and 4', an intermediate bearing being dispensed with and eliminated. I thereby materially reduce the loss by friction and weight of the device—two very important elements in structures of the kind described.

It is quite evident that boss 55 on bearing 13' and partition 23 of the frame can be so made as that said partition shall furnish a support for said boss and bearing, thereby affording an intermediate bearing for shaft 5, but in order to gain the advantage of reduction in friction loss and weight I prefer to eliminate all intermediate bearings for shaft 5 and support the latter by two end bearings only. A branch of duct 30 will lubricate said bearing 13, or lubrication can be provided by splash lubrication from the compressor case.

Suitable hand holes (not shown here) may be provided in case 1 on the motor end to give access to the brushes and other electrical mechanisms, the brushes being suitably supported from said frame or casing.

What I claim and desire to secure by Letters Patent is:

1. A combined motor and compressor consisting of a motor and compressor mounted on a mechanically continuous shaft, a segmental case longitudinally divided and inclosing the motor and compressor, two bearings in said case carrying the shaft and a lubricant circulating system in said case comprising a reservoir, a series of lubricant ducts communicating therewith and a settling chamber.

2. A combined motor and compressor consisting of a motor and a compressor mounted on a mechanically continuous shaft, a case inclosing said motor and compressor, and provided with a lubricant circulating system supplied from a reservoir by the rotation of the compressor, and two bearings in the case for carrying the shaft.

3. In a combined motor and compressor the combination of a stationary casing, a shaft carried by two bearings on said casing, a motor and a rotary compressor mounted on said shaft, a valve in said shaft with which the cylinders of the compressor communicate, and means for lubricating said valve from a reservoir in said casing by the incoming fluid.

4. A combined motor and compressor consisting of a stationary segmental and longitudinally divided frame, a hollow shaft mounted to turn in two bearings longitudinally movable on said shaft, said bearings having lugs which oppose companion lugs in one segment of the frame for retaining the bearings and shaft in said frame, a rotary compressor rigidly mounted on said shaft, and a motor having its moving parts mounted on said shaft and its stationary parts secured to said frame.

5. A combined motor and compressor consisting of a motor and a rotary compressor mounted on a mechanically continuous shaft, and inclosed in a common segmental case, two bearings carrying the shaft, said bearings being longitudinally movable on said shaft for removal therefrom, means for retaining said bearings in one portion of the case and means for supplying lubricant to said bearings from a reservoir by the rotation of the compressor.

6. In a combined motor and compressor the combination of a motor and a compressor mounted on a hollow shaft, a case inclosing said motor and compressor in common, two bearings in the case carrying said shaft, and a port in the shaft through which lubricant is supplied by the incoming fluid as the compressor is revolved.

7. In a combined motor and compressor the combination of a mechanically continuous shaft carried in a two part frame by two bearings, said bearings being longitudinally slidable on said shaft and having lugs which oppose companion lugs in one part of said frame, and a port in said shaft in communication with one of said bearings through which port lubricant from a reservoir in the frame is conveyed to the interior of said shaft by the incoming fluid.

8. In a combined motor and compressor the combination of a separable casing, a shaft, shaft bearings supported in said casing, said bearings having lugs which oppose companion lugs in one portion of said case for supporting said shaft in that portion of the case.

In witness whereof I hereunto set my hand in the presence of two witnesses this 28th day of October, 1905.

CHARLES P. TOLMAN.

Witnesses:
H. F. GLENN,
E. M. HULSE.